July 5, 1960

H. L. SMITH, JR 2,943,836

AUTOMATIC WEIGHING APPARATUS

Filed Oct. 29, 1956

INVENTOR

*Horace L. Smith, Jr.,*

BY

ATTORNEY

July 5, 1960  H. L. SMITH, JR  2,943,836
AUTOMATIC WEIGHING APPARATUS
Filed Oct. 29, 1956  4 Sheets-Sheet 4

INVENTOR
Horace L. Smith, Jr.,

BY
ATTORNEY

United States Patent Office 2,943,836
Patented July 5, 1960

2,943,836

AUTOMATIC WEIGHING APPARATUS

Horace L. Smith, Jr., Richmond, Va., assignor to Horace L. Smith, Jr., Inc., Richmond, Va., a corporation of Virginia Filed Oct. 29, 1956, Ser. No. 618,840

6 Claims. (Cl. 249—9)

This invention relates to automatic weighers, and has for its principal object the provision of an improved mechanism of this character whereby powdered, granular and lumpy solids and similar flowable substances may be continuously fed to the apparatus and rapidly and accurately segregated thereby into batches of substantially uniform predetermined weight. Although the embodiment illustrated in the accompanying drawings and hereinafter described has been developed primarily for use in operations wherein the batch weights are relatively small, i.e., are measured in ounces and fractions thereof (as in the commercial packaging of chemicals, medicines, food products, laundry products, etc.) it nevertheless will be readily understood that the principles involved may be easily applied to the handling of much larger weights.

In prior apparatus of this character there has always been an appreciable amount of the substance in transit between the feeding device and the material-receiving means of the scale at the instant the weight of the material in the latter reaches the point at which it overcomes the scale bias, which transiting material has continued to and been added to the batch. It has been heretofore appreciated that in the interests of accuracy consideration should be given to the weight of this transiting material, for although it may amount to only a small fraction of the weight of each batch, in the commercial packaging of products where thousands of individual weighing operations are performed each day, the aggregate overage can be of substantial importance.

In an effort to meet this difficulty, in some instances the weight of the transiting material has been determined by trial and error for each particular substance to be weighed, and the scale bias reduced accordingly in an attempt to compensate therefor. However, the rate of feed of the material to the scale may not be uniform (and in the case of some materials uniformity may be virtually impossible of attainment), whereby the volume of material in transit between the feeder outlet and the scale pan may vary substantially from operation to operation, and it is thus apparent that any fixed compensating adjustment of the scale bias will not necessarily insure uniformity in the weights of the material batches.

Rapidity of operation is also extremely desirable if not essential, and to this end the rate or volume of feed should be as high as feasible. In an attempt to secure maximum feed while at the same time minimizing the amount of material in suspension when the predetermined batch weight is reached, it has also been heretofore proposed to effect the feed of each batch in two stages, during the first of which the major portion—say, up to 90%—of the batch is deposited in the scale pan or receiver at a relatively high rate, while during the second stage the rate is substantially reduced whereby the remaining portion of the batch is dribbled into the pan. This dribbling of course materially cuts down the amount of material in transit when the scale bias is overcome, but it also slows the operation appreciably, and the mechanism necessary for its accomplishment materially complicates the apparatus.

The mechanism of the present invention is capable of rapidly and accurately segregating flowable materials into batches of uniform predetermined weight without dribbling the last portion of the batch onto the scale, or adjusting the scale bias to compensate for material in transit. Briefly, such apparatus comprises essentially a scale beam having means for receiving the material to be batch-weighed; means such as a chute, conveyor, hopper, etc. for continuously supplying the material thereto at substantially the maximum feasible rate; means for temporarily interrupting the entire feed stream each time the weight of the material deposited on the scale beam reaches the actual predetermined batch value, such means being constructed, arranged and operated to substantially instantaneously completely cut off the feed without dribble of any appreciable amount of material in transit; means functioning concomitantly with said feed interrupting means to remove the weighed batch from the scale during the interruption; and a sensitive pneumatic or similar fluid-pressure system controlled by very small movements of the scale beam for effecting rapid simultaneous operation of the feed interrupting and batch removing means.

In a more limited aspect the invention also includes details of the scale beam construction, and of the fluid-pressure control system, as will appear more fully below and be particularly pointed out in the appended claims.

In the accompanying drawings constituting a part of this specification:

Fig. 7 is an enlarged sectional-elevational view on the plane indicated by the line 7—7 in Fig. 1, looking in the direction of the arrows, and showing details of the scale beam mounting;

Fig. 8 is a sectional view on the plane indicated by the line 8—8 in Fig. 7, looking in the direction of the arrows;

Figure 1:
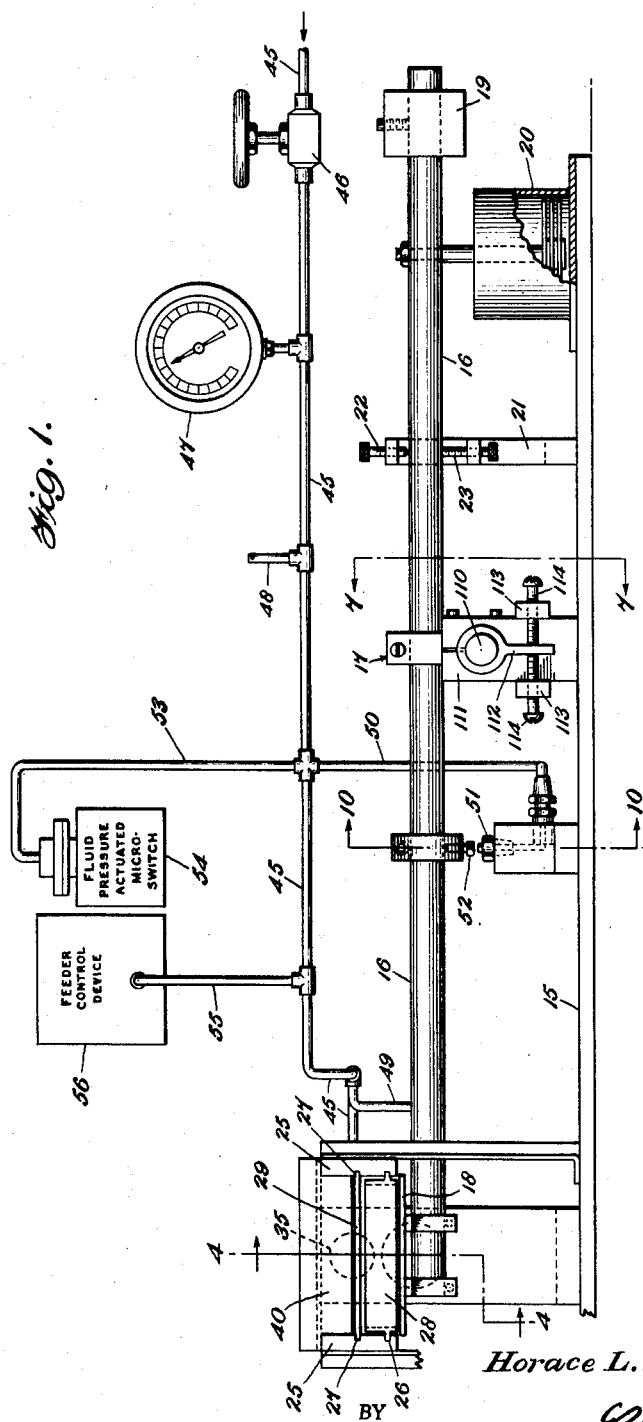
Figure 1 is a side elevation of the essential elements of one form of apparatus constructed and arranged in accordance with the invention, the parts being shown in the positions they occupy during deposit of a batch of material upon the scale beam.

Fig. 9 is a view similar to Fig. 8 but showing adjustment of the parts whereby to vary the predetermined weight value to which the scale beam is responsive; and Fig. 10 is a cross sectional view on the plane indicated by the line 10—10 in Fig. 1, showing the fluid-pressure jet nozzle associated with the scale beam whereby the movements of the latter may, through the fluid-pressure system, be reflected in actuation of the feed intercepting and batch removal means.

Referring to the said drawings in greater detail, the various parts of the apparatus may be mounted upon any appropriate supporting structure, here conventionally shown as a base plate 15. A scale beam 16 is fulcrumed on such support by a mounting structure 17, to be later described in detail, and at one of its ends the beam carries a member, here shown as a plate or platform 18, for receiving the material which is to be batch-weighed. Adjacent its other end the beam is provided with a longitudinally adjustable counterweight 19, manual shifting of which enables static balancing of the beam and the parts carried thereby. A fluid dash-pot 20 is mounted on the support 15 adjacent this end of the beam and is operatively connected thereto, whereby oscillations of the beam may be damped in a manner well known in this art. Also mounted on the base 15 is a standard 21 provided with oppositely arranged adjustable stop screws 22 and 23 which are adapted to positively limit the vertical movements of the beam.

Figure 2:
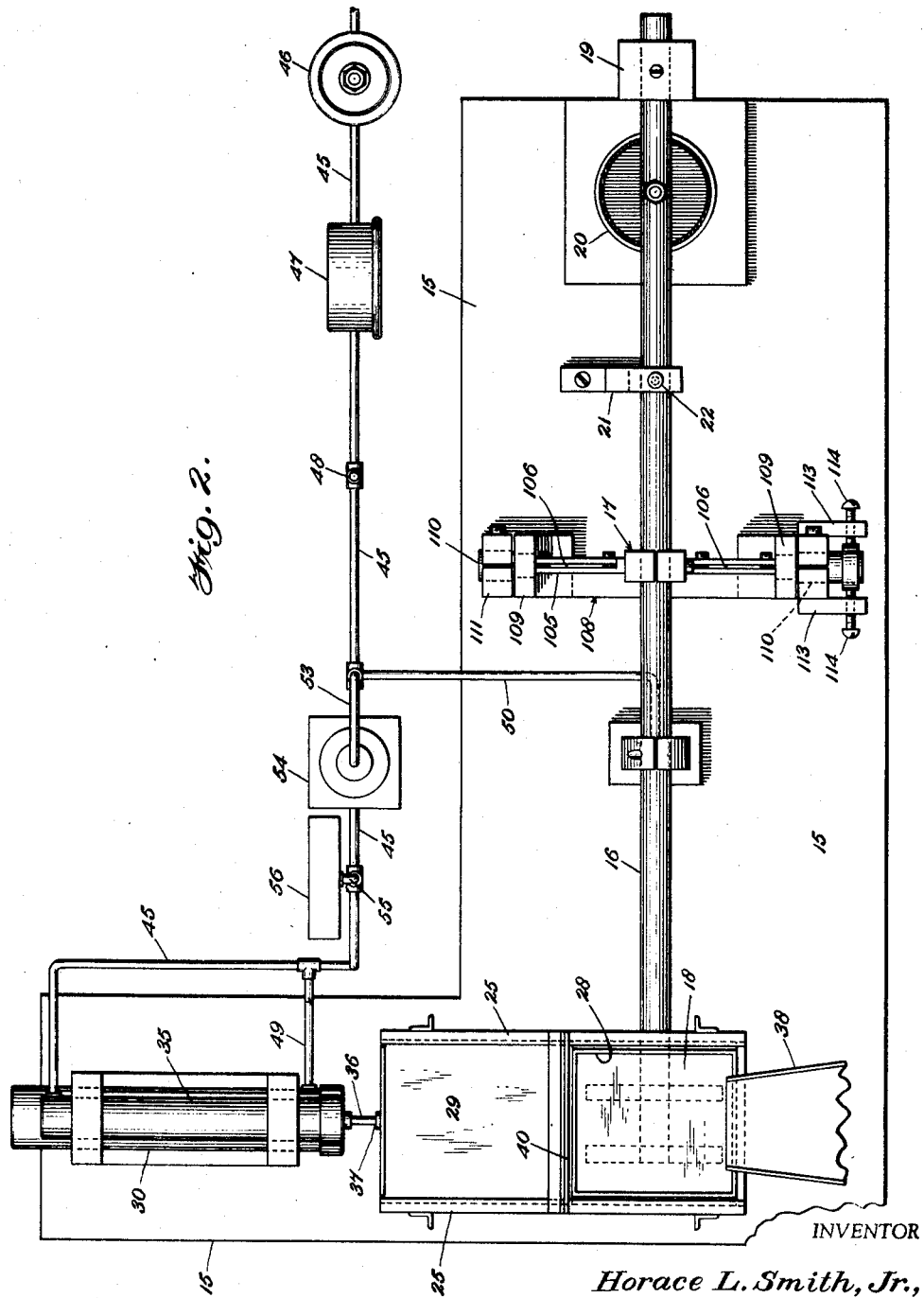
Fig. 2 is a top plan view of the parts shown in Fig. 1.
Figure 3:
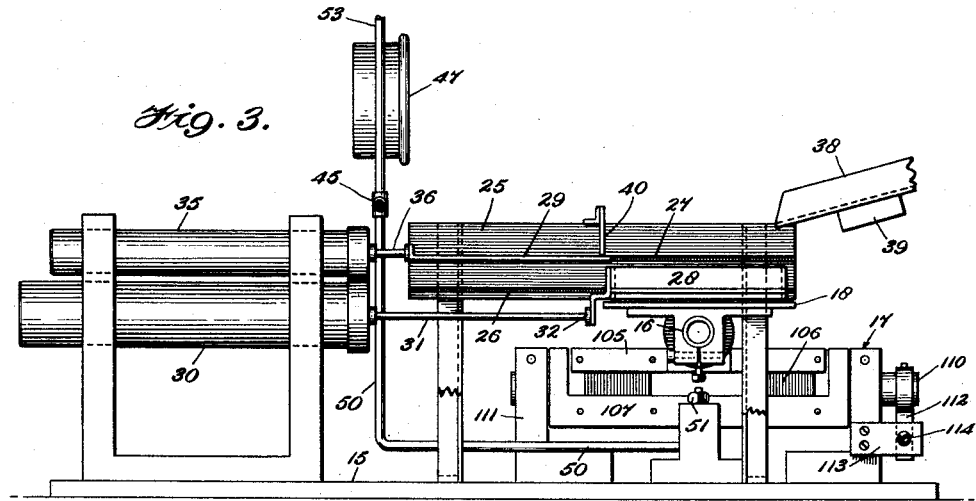
Fig. 3 is an end view thereof, partly broken away, as seen from the left of Fig. 1.

At the platform end of the beam there is provided a pair of fixed spaced parallel guide members 25 having superposed slideways 26 and 27 in which are mounted respectively a loop-like frame or shuttle 28 and a feed cut-off member 29. The said shuttle 28 is slightly smaller than the superficial area of the scale platform 18 and the parts are so constructed and arranged that the lower edge of the perimetric wall of the shuttle just clears the upper face of the platform when the latter is in its normal or unloaded position. The shuttle normally occupies a position directly above the platform, as shown in Figs. 1, 2 and 3, but is retractible therefrom to the position shown in Figs. 4 and 5 at the conclusion of each weighing operation, by means of a pneumatic or similar fluid-pressure motor 30, the piston rod 31 of which is connected to the shuttle at 32. In its normal or forward position the shuttle wall confines the deposited material to the scale platform, but when it is retracted at the conclusion of the weighing it moves the weighed batch from the platform into a packaging or other appropriate container 33 disposed adjacent the latter.

The feed interrupting or cut-off member 29 comprises a plate which is mounted in the slideways 27 of the guides 25 and is reciprocatable therein by means of a fluid-pressure motor 35, the piston rod 36 of which is connected to the plate at 37. The member 29 normally occupies the retracted position illustrated in Figs. 2 and 3 but is moved by its motor 35 to the advanced position shown in Figs. 4 and 5 in which it overlies the scale platform 18. In this position it completely intercepts the stream of material being supplied to the scale by the feeding device, which device is here conventionally illustrated as an inclined chute 38 equipped with an electromagnetic or other suitable vibrating mechanism 39 for causing or assisting in the feeding of the material thereby.

The motors 30 and 35 function concomitantly in opposite directions and thus the advancement of the cut-off member 29 to interrupt the feed stream is substantially simultaneous with the retraction of the shuttle 28 whereby the weighed batch is discharged from the scale. During the time the cut-off slide 29 is in its forward or advanced position, the material being continuously supplied by the feeding device 38 is deposited on the said slide and in order to transfer this accumulation to the scale platform 18 a scraper blade 40 is mounted by and extends between the guides 25, with its lower edge in proximity to the upper face of the cut-off slide. Thus, when the slide is retracted from its Fig. 4 position to its Fig. 3 position any intercepted material carried by it will be scraped off by this blade and deposited on the scale platform 18 to become a part of the new batch.

Figure 4:
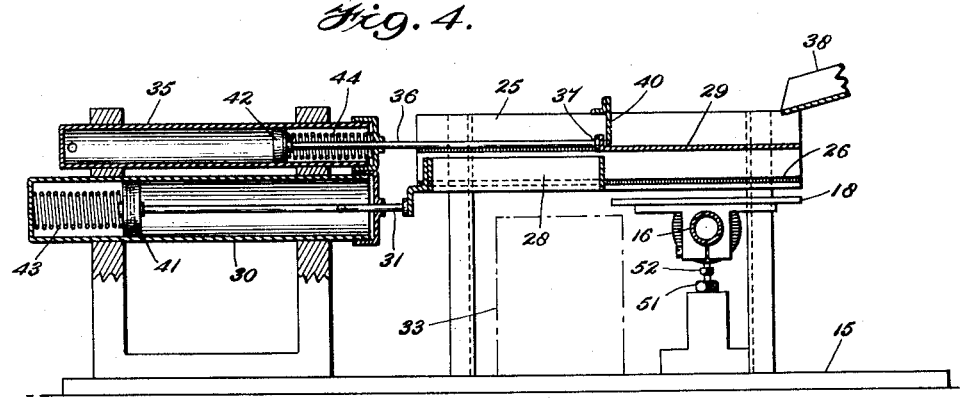
Fig. 4 is a sectional-elevational view on approximately the plane indicated by the line 4—4 in Fig. 1, looking in the direction of the arrows, but illustrating the feed intercepting means and the batch removing means in the positions to which they are moved to respectively interrupt the feed and remove a weighed batch from the scale beam.
Figure 5:
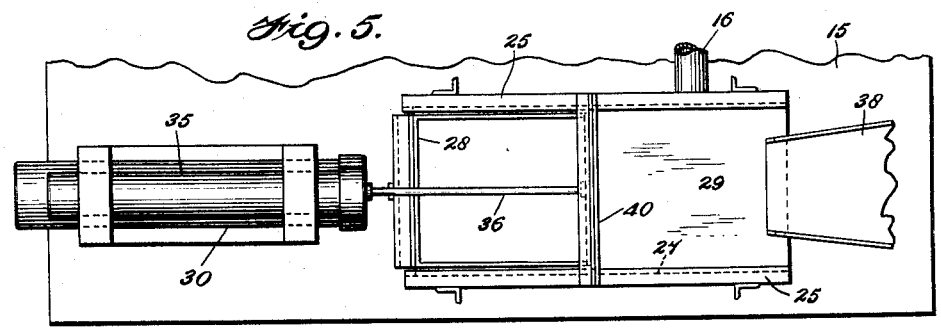
Fig. 5 is a plan view of the parts as shown in Fig. 4.

It will be noted from Figs. 3 and 4 that the cut-off gate 29 reciprocates in proximity to the upper edge of the shuttle 28 which confines the material to the scale platform 18 during building up of the batch. By reason of this proximity of the cut-off member to the top of the batch when said member is advanced to its Fig. 4 cut-off position, and the fact that the cut-off is complete and substantially instantaneous, there can be no appreciable amount of material below it which has not already been weighed and thus no adjustment of the scale bias is necessary to compensate for material in transit between the feeder and the batch. The scale can be biased for the exact batch weight desired and the apparatus will uniformly deliver it.

The fluid-pressure motors 30 and 35 are here shown as being of the single-acting piston type, with the respective pistons 41 and 42 thereof and the parts operable thereby being returned to their normal positions by the compression springs 43 and 44 upon relief of the fluid pressure in the cylinders. The pressure fluid is supplied to said cylinders by a fluid system comprising a supply pipe 45 leading from any appropriate source of compressed air or other fluid, which pipe is provided with an adjustable pressure-reducing and regulating valve 46, a pressure gauge 47, and if desired with a fixed-leak or bleed device 48, to insure against the system becoming static with consequent loss of sensitivity. The pipe 45 extends to and supplies fluid to the cylinder of motor 35, with a branch 49 being connected with and supplying fluid to the cylinder of the motor 30.

A branch 50 of said pipe 45 leads to a nozzle 51 appropriately mounted by the supporting structure 15 in position to discharge a fine jet of the fluid in proximity to an adjustable abutment 52 carried by the scale beam 16, see particularly Figs. 2, 3, 4 and 10. Another branch 53 of said supply pipe 45 leads to a pressure actuated Micro-switch device 54, to be later described in detail, while a branch pipe 55 leads to a feeder control device 56, also to be more fully hereafter described. The beam-carried abutment 52 is so adjusted that when the scale beam is in its unloaded position, illustrated in Figs. 1, 3 and 10, the face of said abutment is slightly spaced from the discharge port of the nozzle 51 and thus, so long as the beam remains in this position, there is a continuous small discharge of fluid from the nozzle. However, when the predetermined batch-weight of material has been supplied to the scale platform, thereby overcoming the scale bias and rocking the beam 16 on its fulcrum, the abutment 52 is moved toward the nozzle 51 thus restricting or cutting off the discharge of fluid therefrom, with a resultant pressure increase or surge in the pipes 45, 49, 53 and 55, and it is this pressure variation which actuates the motors 30 and 35, and the control devices 54 and 56.

That is to say, each time the predetermined batch-weight of material on the scale is reached, the pressure surge in the fluid system causes the piston 42 to advance the slide 29 to completely intercept the material feed stream from the device 38, and the piston 41 to retract the shuttle 28 to remove the weighed batch from the scale. Such removal of course permits the scale bias to restore the beam 16 to its normal position, thus opening the nozzle 51 for normal discharge of fluid therethrough and restoring the pressure in the system to normal whereby the springs 43 and 44 will return the shuttle 28 and cut-off slide 29 to their initial positions for a new cycle of operation. In the course of the return of the slide 29 the material which has accumulated thereon during the cut-off period will be scraped therefrom by the blade 40 and deposited on the scale platform 18 and thus an appreciable amount of the new batch reaches the scale at the very outset of the cycle.

Figure 6:
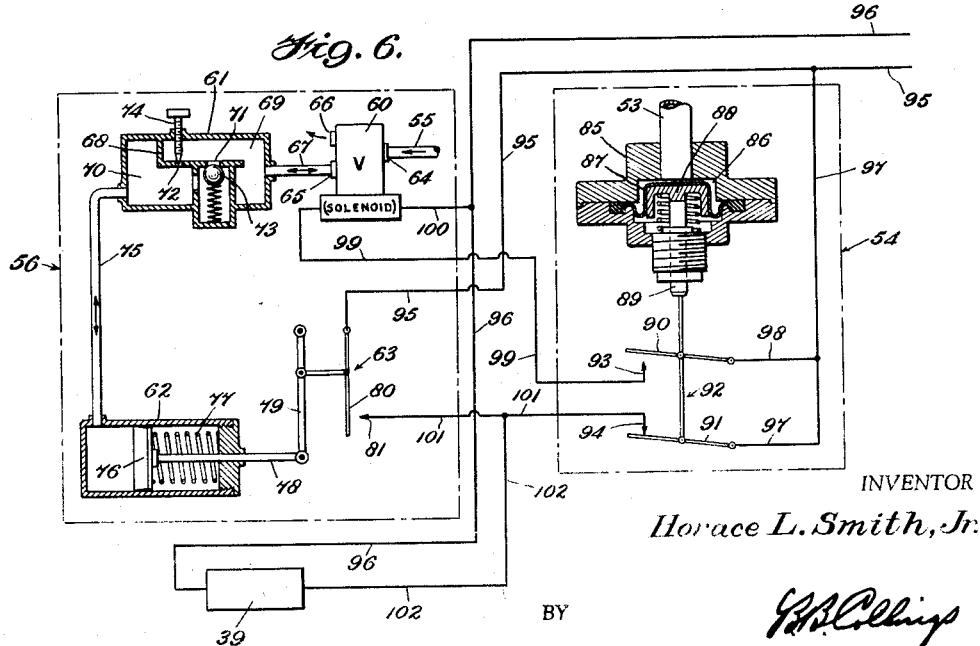
Fig. 6 is a diagrammatic view illustrating certain of the control devices included in the pneumatic system, and the electrical circuits associated therewith.

The control device 56 (Figs. 1 and 6) is a delayed-action mechanism which, while not interfering with the functioning of the feeder 38 so long as the weighing is proceeding normally, will automatically stop the feed in the event of a breakdown or other unintentional stoppage of the weigher, whereby to prevent wastage of the material through piling up thereof on the scale platform 18 and/or the cut-off slide 29. As shown in Fig. 6, the said device 56 comprises a magnetically controlled three-way fluid valve 60, an action-delaying valve device 61, a single-acting fluid pressure motor 62, and a Micro-switch 63. The magnetically controlled valve 60 has an inlet port 64 to which is connected the pipe 55 leading from the fluid supply line 45; a working port 65; and an exhaust port 66. A pipe 67 connects the working port 65 of valve 60 with the action-delaying device 61.

This device comprises a housing having a partition 68 dividing it into two chambers 69 and 70, the only communication between which is afforded by two ports 71 and 72 provided in said partition. The port 71 is controlled by a check valve 73 which permits fluid flow only from chamber 69 to chamber 70, while the port 72 is controlled by a needle valve stem 74 which permits restricted flow between the chambers in either direction. The pipe 67 is connected with the chamber 69, while a pipe 75 provides communication between the chamber 70 and the cylinder of the motor 62. The piston 76 of this motor acts against a return spring 77 and its piston rod 78 is connected through linkage 79 to the movable contact member 80 of the Micro-switch 63 which is adapted to coact with a companion contact 81.

The Micro-switch device 54 is of the fluid-pressure controlled type wherein the actuator comprises a housing 85 having a chamber 86 with which the fluid pipe 53 communicates. A flexible diaphragm 87 extending across and sealing said chamber is engaged by a spring-pressed plunger 88 the stem 89 of which extends slidably through the housing wall and is operatively connected to the movable contact members 90 and 91 of a Micro-switch device 92, which members operate in unison to engage and disengage the companion contact members 93 and 94 respectively. For purposes of sensitivity the capacity of the chamber 86 of the actuator 85 preferably is made as small as possible.

The devices 54 and 56 are electrically interconnected as follows: Current from any suitable source is supplied by mains 95 and 96, the former of which is connected to the contact member 80 of the switch 63, and by branches 97 and 98 to the contact members 91 and 90 of the switch 92. The contact 93 of this switch is connected by a wire 99 to one terminal of the magnetically controlled valve 60, the other terminal of which is connected to the main 96 by a wire 100. The contact 81 of the switch 63 and the contact 94 of the switch 92 are connected by a wire 101, from which a wire 102 leads to one terminal of the feeder vibrator or other actuator 39, the other terminal of which is connected to the main 96. The contacts 80 and 81 of the switch 63, and the contacts 90 and 93 of the switch 92, are normally open while the contacts 91 and 94 of the latter switch are normally closed, all as shown in Fig. 6.

The exhaust port 66 of the magnetically controlled valve 60 is normally closed and its magnetic element de-energized but there is open communication between the pipes 55 and 67 whereby the chambers 69 and 70 of the delayed-action device 61, the pipe 75 and the cylinder of motor 62 are filled with fluid under its normal pressure.

When the bias of the scale beam 16 is overcome by the weight of the batch of material on its platform 18, whereby the beam is moved from its normal position and the fluid jet from the nozzle 51 thus restricted or cut-off as above explained, the resulting fluid-pressure increase in the system is reflected in the pipes 53 and 55 as well as in the pipes 45 and 49 supplying the motors 30 and 35. This pressure increase in the pipe 53 moves the plunger 88 of the actuator 85 outwardly thereby actuating the switch device 92 to close its contacts 90 and 93, and open its contacts 91 and 94. Since the feeder vibrator or motor 39 is being supplied with current through these latter contacts, their opening would ordinarily interrupt the action of the device 39, but the pressure increase in the pipe 55 forces fluid in chamber 69 of the action-delaying device 61 past the check valve 73 into chamber 70 and through pipe 75 to the cylinder of motor 62, thus moving its piston 76 and actuating switch 63 to close the contacts 80 and 81 thereof. Since these contacts are in parallel with the contacts 91 and 94 of the switch 92, a closed circuit of the feeder device 39 will be maintained even though the contacts 91 and 94 are open.

In the meantime the closing of the contacts 90 and 93 of the switch device 92 actuates the magnetic element of the valve 60 whereby such valve is moved to cut off communication between pipes 55 and 67 and establish communication between the latter pipe and the valve exhaust port 66. This results in a reduction in pressure in chamber 69 of the device 61 but equalization of the pressure in this chamber with that in chamber 70, pipe 75 and motor cylinder 62 is delayed because the fluid in these latter elements can return to chamber 69 only through the port 72 which is restricted by the needle valve 74. Thus, the return of piston 76 to its normal position and opening of the switch contacts 80 and 81 is delayed until after the contacts 91 and 94 of switch 92 have been again closed and continuous operation of the feeder device 39 is maintained, so long as the scale functions normally.

If however, anything happens to interrupt the operation of the scale whereby the abnormal pressure in the system is continued and the contacts 90 and 93, and 91 and 94, of the switch 92 are not respectively opened and closed as usual, when the pressure in motor cylinder 62, pipe 75 and chamber 70 becomes equalized with that in chamber 69, the contacts 80 and 81 of the switch 63 will be opened and since the contacts 91 and 94 are also open, actuation of the feeder device 39 will be stopped and the feed of the material cut off until the difficulty is corrected.

The scale beam mounting 17 referred to generally above is best illustrated in Figs. 1, 2, 7, 8 and 9. As will be readily understood therefrom, the beam 16 has rigidly attached to its mid portion a transverse bar 105 to each arm of which there is rigidly secured the upper portion of a flat or leaf spring element 106. The lower portions of these elements are rigidly secured to the cross-bar 107 of a U-shaped cradle 108, the upright legs 109 of which carry trunnions 110 which are journaled in standards 111 secured to the supporting member 15. One of said trunnions 110 rigidly carries a finger 112 which is disposed between a pair of ears 113 carried by the adjacent standard 111 and which mount the opposed adjusting screws 114 the inward ends of which engage the said finger.

In the unstressed condition of the spring elements 106 shown in Fig. 8, material deposited on the scale platform 18 would have to overcome only the inherent resistance to bending possessed by the said elements; however, as shown in Fig. 9, by backing off on one screw 114 and taking up on the other, whereby to rock the cradle 109 upon its trunnions 110 while the beam 16 is held against movement by the stop screw 23, the spring elements may be flexed as shown in said figure whereby to impart any desired bias to the beam and thus predetermine the weight of the batches which will be discharged by the apparatus.

The force of the jet of fluid issuing from the nozzle 51 of course offers a slight resistance to movement of the scale beam but ordinarily this is so small that it may be disregarded. Obviously if desired, it could be canceled out by arranging a second nozzle to discharge against the beam diametrically opposite to the nozzle 51.

The packaging receptacles 33 may be moved to and from batch-receiving position by any appropriate apparatus constituting no portion of the present invention.

What is claimed is:

1. In an automatic weigher, the combination of a fulcrumed scale beam provided with means for receiving a substance to be segregated into batches of uniform predetermined weight; means for biasing said beam for the exact batch weight desired; means for feeding such substance to said receiving means; means movable into and out of the path of the feed stream to intercept the same; a loop-like shuttle disposed between and in proximity to said intercepting means and said receiving means, and movable horizontally from and to a position over the latter in which it perimetrically confines the substance batch thereto during weighing; and fluid-pressure operated means controlled by movements of the scale beam and arranged to actuate said feed intercepting means and said shuttle when a predetermined mass of the substance has been deposited on the receiving means, whereby to cause said intercepting means to substantially instantaneously completely interrupt the feed stream and said shuttle to concomitantly discharge the weighed batch from the receiving means.

2. In an automatic weigher, the combination of a fulcrumed scale beam provided with planar means for receiving a substance to be segregated into batches of uniform predetermined weight; means for biasing said beam for the exact batch weight desired; means for feeding such substance to said receiving means; an open shuttle frame disposed above and in proximity the receiving means and reciprocatable horizontally from and to a normal position thereover in which it perimetrically confines the substance batch to such means during weighing; a cut-off member disposed above and in proximity to said shuttle, and reciprocatable into and out of the path of the feed stream to temporarily intercept the same; and fluid-pressure operated means controlled by movements of the scale beam and arranged to actuate said feed cut-off member and said shuttle frame when a predetermined mass of the substance has been deposited on the receiving means, whereby to cause the cut-off member to instantly completely interrupt the feed stream in proximity to the weighed batch, and concomitantly therewith cause the shuttle to positively remove such batch from the receiving means.

3. In an automatic weigher, the combination of a fulcrumed scale beam provided with a platform for receiving a substance to be rapidly and accurately segregated into successive batches of uniform predetermined weight; means for biasing said beam for the exact batch weight desired; means arranged to supply a stream of the substance to the weigher; an open shuttle frame mounted for horizontal translation between a position over and in proximity to said platform in which it perimetrically confines the substance thereto, and a position laterally displaced from the platform whereby to bodily remove a weighed batch from the latter; a cut-off member reciprocatable adjacent the upper face of said shuttle frame to intercept the entire substance stream in proximity to the surface of a batch within the shuttle frame whereby to prevent addition to such batch of substance in transit between the cut-off member and the batch at the time of interception; fluid-pressure operable means connected to said shuttle frame and cut-off member for rapidly actuating the same; and means sensitively responsive to movements of the scale beam arranged to control said fluid-pressure operable means whereby to actuate said cut-off member and shuttle frame immediately upon attainment of the predetermined batch weight on the platform, thereby instantly completely interrupting passage of the substance stream to the platform and concomitantly translating the weighed batch therefrom.

4. In an automatic weigher, the combination of a fulcrumed scale beam provided with means for receiving a substance to be segregated into successive batches of uniform predetermined weight; means for biasing said beam for the exact weight desired; means operable to normally supply a continuous stream of such substance to the weigher; means arranged to completely intercept said substance stream adjacent said receiving means; means for positively removing the weighed batches from the receiving means; fluid-pressure operable means controlled by movements of the scale beam and arranged to rapidly actuate said stream-intercepting means and said batch-removing means immediately upon attainment of the predetermined substance weight on the receiving means, whereby said stream will be substantially instantaneously completely interrupted and concomitantly therewith the weighed batch will be positively removed from the receiving means; and a delayed-action device controlling said stream supplying means, arranged to inactivate the latter in response to abnormal fluid-pressure conditions in the system resulting from undue interruption of the weighing operations.

5. In an automatic weigher, the combination of a fulcrumed scale beam provided with means for receiving a substance to be segregated into successive batches of uniform predetermined weight; means for biasing said beam for the exact batch weight desired; electrically operable means arranged to normally supply a continuous stream of such substance to the weigher; means arranged to completely intercept said substance stream adjacent said receiving means; means for positively removing the weighed batches from the receiving means; fluid-pressure operable motive means controlled by movements of the scale beam and arranged to actuate said stream-intercepting means and said batch-removing means immediately upon attainment of the predetermined batch weight of substance on the receiving means, whereby to instantly completely interrupt said stream without dribble and concomitantly positively remove the weighed batch from the receiving means; and delayed-action switch means controlling the electrical circuit of the substance supply means, said switch means being responsive to abnormal pressure conditions in the fluid circuit of said motive means resulting from undue interruption of the scale beam movements, whereby to inactivate said substance supply means in case of such interruption.

6. In an automatic weigher, the combination of a fulcrumed scale beam provided with means for receiving a substance to be segregated into successive batches of uniform predetermined weight; means for biasing said beam for the exact batch weight desired; electrically operable means arranged to normally supply a continuous stream of the substance to the weigher; means arranged to completely intercept said substance stream adjacent said receiving means; means for positively removing the weighed batches from the receiving means; fluid-pressure operable motive means controlled by movements of the scale beam and arranged to actuate said stream-intercepting means and said batch-removing means immediately upon attainment of the predetermined weight of substance on the receiving means, whereby to instantly completely interrupt said stream without dribble and concomitantly positively remove the weighed batch from the receiving means; fluid-pressure responsive switch means normally operable at the conclusion of each weighing operation to successively open and close the electrical circuit of the substance supply means; a second switch means operable to close said circuit concomitantly with the opening of the first named switch means, whereby to normally maintain the supply means in continuous operation; and delayed-action means arranged to reopen the second named switch means after a determined time, whereby to inactivate the supply means in case of undue delay in the re-closing of the first named switch means.

References Cited in the file of this patent

UNITED STATES PATENTS

| | | |
|---|---|---|
| 221,518 | Carr et al. | Nov. 11, 1879 |
| 352,753 | Hosea et al. | Nov. 16, 1886 |
| 488,101 | Washington | Dec. 13, 1892 |
| 493,796 | Smyser | Mar. 21, 1893 |
| 616,855 | Richards | Dec. 27, 1898 |
| 1,011,575 | Carter | Dec. 12, 1911 |
| 2,211,193 | Zinke | Aug. 13, 1940 |
| 2,340,531 | Howard | Feb. 1, 1944 |
| 2,584,949 | Weckerly | Feb. 5, 1952 |
| 2,610,726 | Howard | Sept. 16, 1952 |
| 2,634,081 | Knobel | Apr. 7, 1953 |
| 2,634,082 | Knobel | Apr. 7, 1953 |
| 2,646,271 | Williams | July 21, 1953 |
| 2,681,574 | Jack et al. | June 22, 1954 |
| 2,816,437 | Hornberger et al. | Dec. 17, 1957 |
| 2,840,367 | Guss et al. | June 24, 1958 |